United States Patent [19]
Schumacher, II et al.

[11] 3,742,690
[45] July 3, 1973

[54] GROUND-ENGAGING STRUCTURE FOR THE FRONT CUTTING END OF A HARVESTER

[76] Inventors: Gustav Schumacher, II; Gunter Schumacher, both of Haus Nr. 51, 5231 Eichelhardt, Germany

[22] Filed: Mar. 1, 1972

[21] Appl. No.: 230,731

[30] Foreign Application Priority Data
  Mar. 8, 1971  Germany............... P 21 10 973.9
  Aug. 23, 1971  Germany............... P 21 42 153.4

[52] U.S. Cl. ................................................. 56/313
[51] Int. Cl. .......................................... A01d 65/02
[58] Field of Search.................. 56/312, 313, 314, 56/318, 319, 320, 80, 94

[56] References Cited
UNITED STATES PATENTS
1,172,033  2/1916  Mueller............................. 56/320
1,231,690  7/1917  Anderson........................... 56/313
2,099,471  11/1937  Edgington......................... 56/312
2,892,298  6/1959  Chaney............................. 56/314
3,313,095  4/1967  Gaterman.......................... 56/312
3,579,967  5/1971  Schumacher....................... 56/313

FOREIGN PATENTS OR APPLICATIONS
69,700  10/1945  Norway............................. 56/318
864,637  1/1953  Germany............................ 56/318

Primary Examiner—Russell R. Kinsey
Attorney—Harold D. Steinberg et al.

[57] ABSTRACT

A ground-engaging structure to be situated at the front cutting region of a harvester. The structure has a forwardly and downwardly extending elongated support which at its rear upper end is fixed to the harvester at the cutting region thereof. A rearwardly and downwardly extending elongated support is fixed to the forwardly extending support intermediate the ends thereof and this rearwardly extending support carries at ground level a structure for slidably engaging the ground.

21 Claims, 10 Drawing Figures

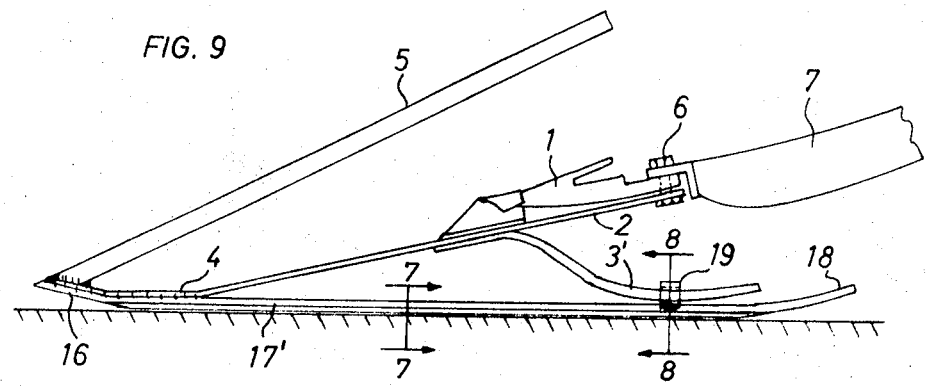
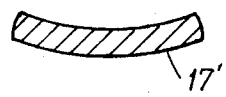
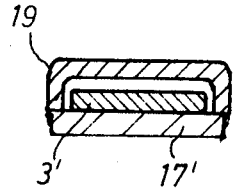
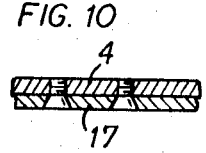
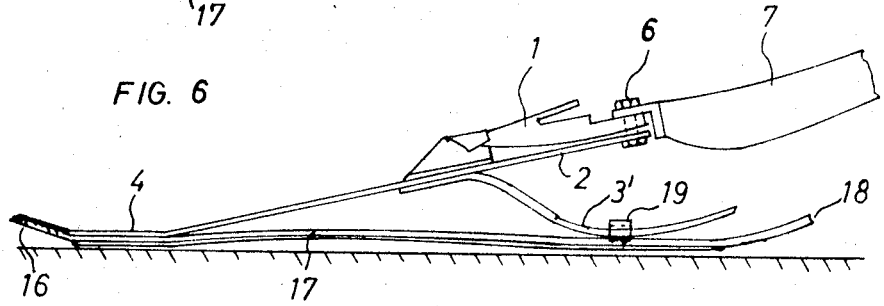

GROUND-ENGAGING STRUCTURE FOR THE FRONT CUTTING END OF A HARVESTER

BACKGROUND OF THE INVENTION

The present invention relates to harvesters as well as to combines of harvesters and threshers.

The invention relates in particular to the front cutting region of a harvester.

The invention in particular relates to a structure for guiding the front cutting region of a harvester along the ground.

As is well known, the front cutting region of a harvester is relatively heavy. Difficulties are always encountered in guiding the front cutting region of a harvester along the ground in such a way that only a relatively small fraction of its weight engages the ground so that it can easily follow all irregularities in the ground, while the major part of the weight is supported from the frame of the vehicle by way of a hydraulic lifting structure.

In the event that the front cutting region of the harvester has too great a portion of its weight engaging the ground, the cutting mechanism digs very easily into the ground. In the event that the pressure of the cutting mechanism with respect to the ground is too low, the cutting mechanism will not follow ground irregularities. In order to enable a larger portion of the weight of the cutting mechanism to be supported on the ground, it has already been proposed to provide the cutting mechanism with more or less wide slide members. However, these ground-engaging members which slidably engage the ground always extend so far to the rear of the critical cutting line that they influence the cutting mechanism only after the cutting beam has already passed a ground obstruction or a raised portion of the ground. In addition, these elongated members which slidably engage the ground provide an undesirably large resistance to movement of the harvester and are inclined to push loose earth in front of themselves so that this loose earth piles up to the region in front of the cutting beam after only a few meters of travel.

An arrangement according to which the weight of the cutting structure is supported on the ground by way of the grain lifters, makes very strong and therefore non-elastic grain lifters a necessity, so that with such a construction it is not possible for the grain lifters to compensate for ground irregularities.

SUMMARY OF THE INVENTION

It is accordingly a primary object of the present invention to provide a structure which will avoid the above drawbacks.

In particular, it is an object of the present invention to provide a structure where the front cutting region of a harvester is supported for movement along the ground in a manner which is greatly improved as compared to previously known constructions.

Thus, it is an object of the invention to provide at the cutting region of the harvester ground-engaging structure which slidably engages the ground while at the same time providing no or very little resistance to travel while at the same time opposing the weight supported thereby with a greater lifting force than has heretofore been possible.

It is also an object of the present invention to provide ground-engaging support structure which slidably engages the ground with sufficient elasticity so that when it is stressed to an extremely large extent by any obstructions it will be capable of yielding upwardly and at the same time will automatically return to its normal operating position after moving beyond the obstruction.

Yet another object of the present invention is to provide an arrangement where it becomes possible to locate the supporting structure which slidably engages the ground directly beneath the cutting line, so that the cutting line will also be directly influenced by ground irregularities, to avoid an operation where the cutting line only becomes influenced by the ground irregularities after the latter have become situated behind the cutting line.

A further object of the present invention is to provide the possibility of quickly exchanging the supporting structure which slidably engages the ground while at the same time manufacturing this structure at a low cost so that replacement parts can be mounted and stored without requiring a large amount of time or large costs. This is particularly important because it is the components which slidably engage the ground which are constantly subjected to friction and wear.

In accordance with the invention the front cutting region of the harvester has fixed thereto the rear end of a forwardly and downwardly extending elongated support means, and a rearwardly and downwardly extending support means is fixed to the forwardly extending support means intermediate the ends thereof. A ground-engaging means is operatively connected with the rearwardly extending support means at the ground elevation for slidably engaging the ground.

BRIEF DESCRIPTION OF DRAWINGS

The invention is illustrated by way of example in the accompanying drawings which form part of this application and in which:

FIG. 6 is a fragmentary side elevation of a further embodiment of a ground-engaging structure according to the invention;

FIG. 7 is a transverse section, on an enlarged scale as compared to FIG. 9, illustrating the cross section of a ground-engaging means of FIG. 9, the section of FIG. 7 being taken along line 7—7 of FIG. 9 in the direction of the arrows;

FIG. 8 is a transverse section along line 8—8 of FIG. 9 in the direction of the arrows showing at an enlarged scale structure which connects the ground-engaging means of FIG. 9 with the rearwardly extending support means;

FIG. 9 is a partly fragmentary side elevation of a ground-engaging structure of the invention which also has a grain lifter;

FIG. 10 is a fragmentary sectional illustration of another embodiment.

DESCRIPTION OF PREFERRED EMBODIMENTS

Figure 1:
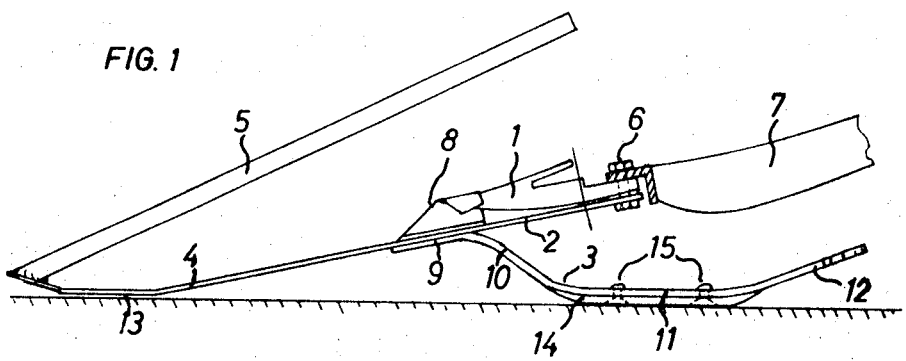
FIG. 1 is a schematic, partly sectional and partly fragmentary side elevation of a ground-engaging structure according to the invention shown in FIG. 1 joined with a grain lifter and shown supported by a divider which is fixed to the cutter bar by a bolt which also fixes the structure of the invention the the harvester.

Referring to FIG. 1, the structure shown therein includes a divider 1 in the form of a finger which, as is well known, forms one of a series of fingers which extend in the direction of travel of the harvester and which are distributed so as to divide the grain in preparation for cutting thereof. Fixed to the divider 1 is a forwardly extending elongated support means 2 in the form of an elongated bar or strip of suitable metal extending forwardly and downwardly from the divider 1. A rearwardly extending support means 3 is in the form of an elongated springy metal member made of hardened spring steel, for example, and fixed to the forwardly extending support means 2 intermediate the ends thereof and extending downwardly and rearwardly therefrom as shown in FIG. 1. The front end region 4 of the forwardly extending support means 2 has a portion 13 which slidably engages the ground and which at its front end is tilted upwardly and is fixed to an upwardly and rearwardly extending elongated grain lifter 5. The front end of the downwardly and forwardly extending support means 2 is pointed, as is apparent from FIG. 3.

The upper rear end of the forwardly extending support means 2 is formed with a slot through which the bolt 6 passes, this bolt 6 serving as a securing means to fix the divider 1 to the cutting beam 7 as well as the forwardly extending support means 2 of the structure of the invention. A connecting means is provided for connecting the forwardly extending support means 2 to the divider 1, and in the illustrated example this connecting means takes the form of a strap 8 which is fixed, as by welding, to the top surface of the forwardly extending support means 2 and which extends from this top surface around and over the top edge of the divider 1, thus in effect suspending the forwardly extending support means 2 from the divider 1. Preferably the connecting means 8 connects the forwardly extending support means 2 with the divider 1 in such a way that the support means 2 is under stress thus eliminating any play or looseness in the connection between the divider 1 and the elongated support means 2. It will be noted that the connecting means 8 connects the support means 2 to the front tip region of the divider 1.

The rearwardly extending support means 3 is fixed to the forwardly extending support means 2 at the elevation of the connecting means 8 directly beneath the latter, as by being welded to the lower surface of the elongated metal bar or strip which forms the support means 2. Preferably the entire support means 3 is made of a springy hardened flat material such as a suitable steel or iron. This rearwardly extending support means 3 is made up of the front elongated fixing portion 9 which extends along and is fixed directly to the support means 2 as by being welded thereto, a downwardly and rearwardly extending portion 10 extending rearwardly from from and forming an extension of the portion 9, an elongated horizontal portion 11 which is situated at the elevation of the ground and extends therealong, and the rear portion 12 which is inclined upwardly and which preferably terminates in a pointed rear end. A ground-engaging means for slidably engaging the ground is connected with, and may form part of, the rearwardly extending support means 3 at the portion 11 thereof. This elongated portion 11 has a front which is located approximately in alignment with the cutting line, which is to say beneath the line along which the blade cuts the crops, and this elongated portion 11 extends rearwardly behind the cutting line preferably through a distance of approximately 25 cm, where this elongated portion 11 merges into the rising portion 12.

When the cutting mechanism is lowered to its operating position, the front slide region 13 of the support means 2 engages the ground so that the grain lifter 5 becomes operative, and at the same time the ground-engaging means at the portion 11 of the rearwardly extending support means 3 engages the ground. The elongated portion 11 of the springy strip or bar which forms the rearwardly extending support means 3 may itself form the ground-engaging means for slidably engaging the ground, and such an embodiment is indeed illustrated in FIGS. 2, 4, and 5. Because of the loading which takes place in a vertical direction, there is an opposed loading at the elongated support means 2. While the forwardly extending support means 2 under this loading tends to yield in a clockwise direction, as viewed in FIG. 1, the rearwardly extending support means 3 moves in a counterclockwise direction, and as a result the ideal turning point becomes situated approximately in alignment with the cutting line. Since the forwardly extending support means 2 and the rearwardly extending support means 3 are fixed directly to each other, there if created an upwardly directed pressure in opposition to the load, and this upwardly directed pressure also acts at the level of the cutting line.

By forming the ground-engaging means which slidably engages the ground as the elongated portion 11 of the rearwardly extending relatively narrow strip or bar which forms the support means 3, there is practically no resistance to travel of the harvester, and the portion 11 of the rearwardly extending support means 3 moves precisely along the path of sliding created by the front portion 13 of the support means 2 which carries the grain lifter 5, so that a path is preliminarily cleared for the following ground-engaging means which may be formed by the portion 11 of the support means 3.

As has been pointed out above, the dividers 1 are distributed across the entire cutting width of the cutting mechanism of the combine, and it is preferred to situate the structure of the invention, as shown in FIG. 1, at every third divider 1, so that a series of structures as shown in FIG. 1 are distributed across the front of the harvester with two dividers 1 being situated between each pair of successive structures of the invention, and of course these structures include not only the means for slidably engaging the ground, which may be formed by the portion 11 of the support means 3, but also the grain lifters 5. In this way an extremely large carrying capacity is achieved. Since, in contrast to previously known constructions, the ground-engaging means which slidably engages the ground in accordance with the invention extends through a relatively large distance forwardly, the irregularities in the ground exert their influence on the cutting mechanism at the level of the critical cutting line, and not when the cutting line has already moved beyond the ground irregularities.

As is particularly apparent from FIGS. 1–5, the pointed upwardly extending rear portion 12 of the rearwardly extending support means 3 will make it possible for the combine to travel rearwardly without resistance.

Figure 3:
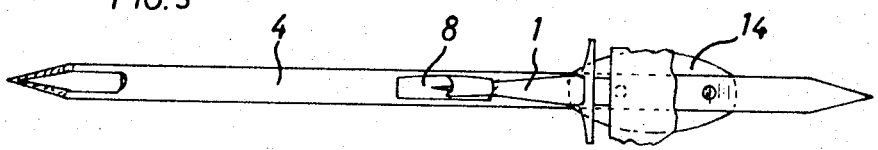
FIG. 3 is a top plan view of the structure of FIG. 1 with the grain lifter broken away so as to show the structure therebeneath.

In the embodiment of the invention which is illustrated in FIGS. 1 and 3 the ground-engaging means which slidably engages the ground takes the form of a slide plate 14 which is removably fixed with the elongated portion 11. Thus, a pair of screws 15 may be provided for releasably fixing the ground-engaging means 14 to the portion 11. This ground-engaging means formed by the slide plate 14 is, as is particularly apparent from FIG. 3, tapered such as by being rounded or pointed, at its front and rear ends, so that there will be no great resistance when encountering stalks. Moreover, these slide plates 14 because of their wider dimensions are particularly adapted to prevent sinking of the rearwardly extending support means into the ground when the ground is relatively soft.

Figure 2:
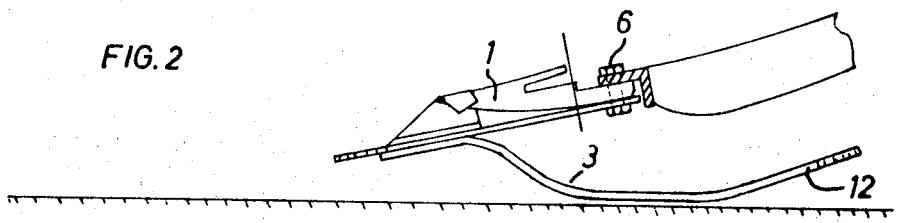
FIG. 2 is a fragmentary partly sectional side elevation of a further embodiment of a ground-engaging structure according to the invention.
Figure 5:
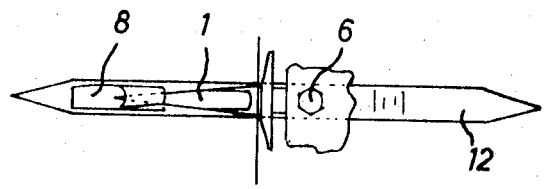
FIG. 5 is a partly fragmentary top plan view of the embodiment of FIG. 2.

In some cases it is preferred to provide a combine which does not use grain lifters. In order to be able to support in this case also a part of the weight of the cutting mechanism on the ground, the embodiment of FIGS. 2 and 5 is used. In this embodiment the front end of the forwardly extending support means 2 is also pointed, as shown in FIG. 5, but this front end is raised above the ground and is situated only a slight distance forwardly from the connecting means 8 and the front end region 9 of the rearwardly extending support means 3. As has been pointed out above, in this embodiment the elongated portion 11 of the rearwardly extending support means 3 itself forms the ground-engaging means for slidably engaging the ground. The embodiment of FIGS. 2 and 5 is fixed with the cutting region of the harvester in the same way as described above in connection with FIGS. 1 and 3.

Figure 4:
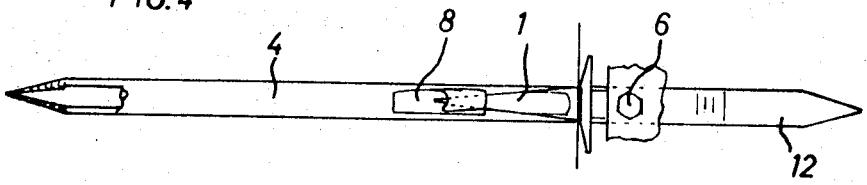
FIG. 4 is a top plan view of an embodiment which differs from that of FIGS. 1 and 3 in that the embodiment of FIG. 4 does not have an additional slide plate.

The embodiment of FIG. 4 is identical with that of FIGS. 1 and 3 except that with the embodiment of FIG. 4 there is no additional slide plate 14 and the ground-engaging means which slidably engages the ground is formed by the elongated portion 11 of the rearwardly extending support means 3.

FIG. 6 illustrates an embodiment of the invention where the elongated forwardly extending support means 2 is also fixed to the cutting mechanism 7 by way of a bolt 6 which also serves to fix to the cutting mechanism a divider finger 1 to which the forwardly extending support means 2 is fixed by a connecting means 8 as described above. The elongated forwardly extending support means 2 of this embodiment also is fixed intermediate its ends to the rearwardly extending means 3' and at its front end region 4 terminates in an upwardly directed pointed end at the elevation of the ground. This pointed end 16 is illustrated in FIG. 6.

With this embodiment the ground-engaging means for slidably engaging the ground takes the form of an elongated slide member 17 which is fixed, as by welding, to the front end region 4 of the forwardly extending support means 2, directly at the pointed front end 16 thereof. The ground-engaging means 17 of FIG. 6 extends beneath and along the front end region 4 of the support means 2, rearwardly beneath and beyond the rearwardly extending support means 3'. A connecting means is provided for connecting the ground-engaging means 17 with the rearwardly extending support means 3', and in the illustrated example this connecting means takes the form of a strap 19 which extends with clearance around the lower portion of the support means 3' and which is fixed at its ends to the top surface of the ground-engaging means 17. Although the structure of FIG. 8 is taken on a section in FIG. 9, this structure is identical in the embodiment of FIG. 6. Because of the clearance with which the connecting means 19 connects the ground-engaging means 17 with the rearwardly extending support means 3', it is possible for the ground-engaging means 17 and the support means 3' to flex and move longitudinally one with respect to the other. The elongated ground-engaging means 17 terminates in an upwardly curved rear portion 18. Between the front portion 4 of the support means 2 and the lower portion of the rearwardly extending support means 3', the ground-engaging means 17 is curved upwardly, as shown in FIG. 6.

The embodiment of FIG. 9 is identical with that of FIG. 6 except that FIG. 9 has grain lifter 5 and the elongated ground-engaging means 17' is curved downwardly between the portion 4 of the forwardly extending support means 2 and the rearwardly extending support means 3'. The cross section of the ground-engaging means 17 illustrated in FIG. 7 is also provided for the embodiment of FIG. 6. However, it is to be noted that at the region where the ground-engaging means 17' is connected to the support means 3' the ground-engaging means 17' is flat, as shown in FIG. 8. In FIG. 9 the front end of the support means 2 fixedly carries an upwardly and rearwardly inclined grain lifter or stalk lifter which may be in the form of a tube or pipe. FIG. 6, however, illustrates an embodiment where there is no grain lifter.

The structures of the invention respectively illustrated in FIGS. 6 and 9 also may be connected with every third divider 1. The embodiment of FIG. 9 of course is capable of functioning as a grain lifter as well as to support the cutting mechanism in the manner described above in accordance with the present invention.

The structure of the invention is readily attached to the cutting region of the harvester. Thus, each forwardly extending support means 2 receives at its rear slotted end screw 6 which fixes the divider 1 to the mechanism, so that this screw 6 can also operate to fix the rear end of the support means 2 to the mechanism. The connecting means 8 is simply hooked onto the front region of the divider 1 so as to connect the support means 2 to the divider 1 with the stress or tension referred to above.

The front pointed end of the support means 2 of course eliminates resistance during forward movement of the structure.

The combination of the structure of the invention with a grain lifter has proved in practice to be extremely advantageous. Grain lifters are practically always required in certain parts of the world, because as a result of the influence of weather it is always necessary to take into consideration fallen stalks. The grain lifters themselves form a part of the structure which is subjected to wear. Because of the one-piece combination with the structure which slidably engages the ground and becomes worn, there is provided an unitary combination which is subjected to wear and which is of considerable advantage because the parts which become worn have the same simple fastening structure and thus an exchange of all of the worn components can take place in one operation.

The embodiment of the invention where an additional slide plate 14 is provided has proved to be of great advantage because this component can be manufactured separately with great savings in cost.

The embodiments of the invention which are illustrated in FIGS. 6 and 9 have proved to be of great advantage in certain cases. Thus, in certain special cases, particularly where extremely loose earth is encountered, it can happen that this earth builds up in front of the structure which slidably engages the ground. The cutting mechanism will become exposed to this earth and frequent cleaning of the cutting mechanism will be required. This disadvantage is avoided with embodiments such as those shown in FIGS. 6 and 9 because with these embodiments the ground-engaging means 17 extends forwardly all the way up to the front region 4 of the forwardly extending support means 2. With this arrangement of FIGS. 6 and 9 the weight is distributed between the front end region of the ground-engaging means 17 where the latter is fixed to the front portion 4 of the support means 2 and the rear end region thereof where the connecting means 19 connects the ground-engaging means 17 to the support means 3' so that the ground-engaging means 17 will prevent this earth from collecting in front of the structure which slides along the ground.

Although the front end of the ground-engaging means 17 may be welded directly to the front end of the support means 2, inasmuch as the means 17 will be subjected to considerable wear it is preferred to provide a releasable connection between the front end of the ground-engaging means 17 and the front end region of the support means 2, so that exchange of worn ground-engaging means 17 may easily take place. For this purpose it has proved to be of advantage to use countersunk screws (FIG. 10) which do not create any resistance to forward movement of the structure.

By providing the relative movability between the support means 3' and the ground-engaging means 17, the full elasticity of the components is maintained.

The connecting means 19 has proved to be of considerable advantage because it provides the required guiding for the ground-engaging means 17 and at the same time permits it to yield as required when encountering a heavy load. The upwardly curved rear end 18 is of advantage so that during rearward movement of the combine the means 17 will not dig into the ground.

The channel-shaped configuration shown in FIG. 7 according to which the ground-engaging means 17 has a lower convex surface is of advantage since this construction achieves an increase in the stability of the member 17 and on the other hand during turning of the combine the ground-engaging means 17 does not easily cut into the ground.

The structure of FIG. 6 according to which the ground-engaging means 17 is curved upwardly between the front portion of the support means 2 and the rearwardly extending support means 3' it has also proved to be of considerable advantage in connection with certain types of ground which are encountered and certain details of the harvester construction, as compared with the conventional forms of a ground-engaging slide structure. However, it is also possible to curve this portion of the ground-engaging means 17' downwardly, as described above in connection with FIG. 9 where although the ground-engaging means 17' is shown as extending straight between the portion 4 of support means 2 and the lower portion of support means 3', when this structure is not under stress the means 17' is indeed curved downwardly with a curvature opposite to that shown in FIG. 6. This type of construction is also of advantage when encountering certain types of operating conditions.

Of course, by providing the grain lifter 5 it is possible for the structure to perform a double function.

What is claimed is:

1. In a harvester having a forward cutting region, elongated forwardly extending support means having a rear end fixed to said cutting region and extending forwardly and downwardly therefrom, elongated rearwardly extending support means fixed to said forwardly extending support means at an intermediate region of the latter and extending downwardly and rearwardly from said forwardly extending support means, and ground-engaging means carried by said rearwardly extending support means at a portion thereof which is at ground level and which is situated rearwardly from and lower than said intermediate region of said forwardly extending support means to which said rearwardly extending support means is fixed.

2. The combination of claim 1 and wherein an elongated divider is located at said cutting region of the harvester, securing means fixing said divider to said cutting region of the harvester, and said securing means also fixing the rear end of said forwardly extending support means to said cutting region of the harvester, and connecting means fixed to said forwardly extending support means and extending around said divider for connecting said forwardly extending support means thereto.

3. The combination of claim 2 and wherein said connecting means connects said forwardly extending support means to said divider while maintaining said forwardly extending support means under stress.

4. The combination of claim 1 and wherein said forwardly extending support means terminates in a pointed front end.

5. The combination of claim 1 and wherein said forwardly extending support means carries at its front end an upwardly and rearwardly inclined elongated grain lifter.

6. The combination of claim 1 and wherein said rearwardly extending support means has a front elongated portion extending along and fixed to said forwardly extending portion, a downwardly and extending portion extending and from said front elongated portion, an elongated substantially horizontal portion extending parallel to the ground and extending rearwardly from said downwardly and rearwardly extending portion, and a rear upwardly inclined portion extending rearwardly from said elongated horizontal portion.

7. The combination of claim 6 and wherein said elongated horizontal portion of said rearwardly extending support means has a front end situated substantially in line with the cutting line of the harvester and said horizontal portion extending rearwardly from said front end thereof through a distance of approximately 25 cm before joining said upwardly and rearwardly extending rear portion of said rearwardly extending support means.

8. The combination of claim 6 and wherein said rear portion of said rearwardly extending support means terminates in a pointed end.

9. The combination of claim 1 and wherein said rearwardly extending support means is made of a springy, hardened steel.

10. The combination of claim 1 and wherein said ground-engaging means forms an integral part of said rearwardly extending support means.

11. The combination of claim 1 and wherein said ground-engaging means is in the form of an elongated slide plate which is wider than said rearwardly extending portion and which is removable fixed thereto.

12. The combination of claim 11 and wherein said slide plate has front and rear tapered ends.

13. The combination of claim 1 and wherein said forwardly extending support means terminates in a lower front end located at ground elevation, and said ground-engaging means including an elongated slide member having a front end fixed to said forward end of said forwardly extending support means and extending rearwardly therefrom beneath said rearwardly extending support means and connected to the latter to be supported thereby.

14. The combination of claim 13 and wherein said front end of said ground-engaging means is welded to the front end of said forwardly extending support means.

15. The combination of claim 13 and wherein the front end of said ground-engaging means is releasably fixed with the forward end of said forwardly extending support means.

16. The combination of claim 13 and wherein a connecting means connects said elongated ground-engaging means and said rearwardly extending support means to each other for longitudinal movement one with respect to the other.

17. The combination of claim 16 and wherein said connecting means includes a strap fixed to said ground-engaging means and extending with clearance around said rearwardly extending support means.

18. The combination of claim 13 and wherein said ground-engaging means has a rear end portion which is curved upwardly.

19. The combination of claim 13 and wherein said ground-engaging means has a channel-shaped cross section and a convex lower surface.

20. The combination of claim 13 and wherein said ground-engaging means is curved upwardly between the forward end of said forwardly extending support means and said rearwardly extending support means.

21. The combination of claim 13 and wherein said ground-engaging means is curved downwardly between said forward end of said forwardly extending support means and said rearwardly extending support means.

* * * * *